(12) United States Patent
Li et al.

(10) Patent No.: US 7,219,252 B1
(45) Date of Patent: May 15, 2007

(54) APPARATUS AND METHOD FOR DYNAMIC OVERCLOCKING

(75) Inventors: Gabriel Li, San Francisco, CA (US);
Chwei-Po Chew, Cupertino, CA (US);
Johnson Tsai, Taipei (TW)

(73) Assignee: Cypress Semiconductor Corp., San Jose, CA (US)

( * ) Notice: Subject to any disclaimer, the term of this patent is extended or adjusted under 35 U.S.C. 154(b) by 348 days.

(21) Appl. No.: 10/888,470

(22) Filed: Jul. 9, 2004

(51) Int. Cl.
*G06F 1/08* (2006.01)
(52) U.S. Cl. .................................. 713/501; 331/177 R
(58) Field of Classification Search ................ 713/500, 713/501, 502
See application file for complete search history.

(56) References Cited
U.S. PATENT DOCUMENTS 6,622,254 B1 * 9/2003 Kao ........................... 713/500

6,665,808 B1 * 12/2003 Schinzel ..................... 713/501
2003/0229816 A1 * 12/2003 Meynard ..................... 713/600
2005/0071705 A1 * 3/2005 Bruno et al. ................. 713/500

* cited by examiner

*Primary Examiner*—Thuan Du
(74) *Attorney, Agent, or Firm*—Marger Johnson & McCollom P.C.

(57) ABSTRACT

According to embodiments of the invention, temperature, current, or other physical quantities associated with an integrated circuit, which can also include a processor, may be converted to a digital signal, and that digital signal used to choose a corresponding frequency offset that is added to any pre-established overclocking frequency. Embodiments of the invention allow a user to specify a dynamic range between which the frequency offset is bounded during overclocking of the integrated circuit. The programmable lower limit specifies the frequency where the integrated circuit begins to overclock. The programmable upper limit specifies the maximum overclocking frequency that is allowed. Setting the lower limit to be equal to the upper limit forces overclocking to occur at only the specified value.

17 Claims, 4 Drawing Sheets

APPARATUS AND METHOD FOR DYNAMIC OVERCLOCKING

BACKGROUND OF THE INVENTION

1. Technical Field of the Invention

This disclosure relates in general to overclocking, and more particularly, to a method and apparatus for dynamically changing the clock frequency of a CPU when the CPU is running in an overclocked mode.

2. Description of the Related Art

"Overclocking" is a term that is commonly used to refer to the process of resetting a processor-based system so that the processor runs faster than the speed specified by the manufacturer. Overclocking is possible because processor manufacturers typically label the speeds of their processors somewhat conservatively. For example, a processor that is advertised to have a speed of 166 MHz may in fact be successfully run in an overclocking mode at 200 MHz.

Overclocking is frequently accomplished by resetting the system bus speed to a slightly higher level. After the system bus is reset, the processor is often able to successfully adjust to the higher system bus speed.

In some cases the processor may also be overclocked by programming an I2C (Inter-IC) register interface after the system boots up. An example of this is illustrated with reference to FIG. 1 and Table 1.

FIG. 1 is a block diagram illustrating some components of a conventional clock synthesizer 100. The clock synthesizer 100 includes an M-counter 102, a Phase Frequency Detector (PFD)/Charge Pump (CP) 104, a Loop Filter (LF) 106, a Voltage Controlled Oscillator (VCO) 108, an F-counter 110, and an N-counter 112.

The input frequency $F_{REF}$ is divided by the value in M-counter 102 before feeding into PFD/CP 104. Through the PFD/CP 104, the LF 106, and VCO 108, the frequency is multiplied by the value in N-counter 112. The output frequency $F_{CPU}$ is taken from the VCO 108 after being divided by the value in F-counter 110. Assuming that the clock synthesizer 100 achieves an initial output frequency $F_{CPU}$ of 100 MHz upon startup, a user may subsequently place the processor in an overclocking mode by setting the value of N-counter 112 to a value other than 200. In other words, $F_{CPU}$ may be calculated using the following equation:

$$F_{CPU} = (F_{REF} * N\text{-counter}) / (M\text{-counter} * F\text{-counter}) \quad [\text{EQ. 1}]$$

Table I below lists example frequencies that can be achieved from VCO 108 and from F-counter 110 ($F_{CPU}$) given a specific value of 60 for the M-counter 102, a specific value of 8 for the F-counter 110, a specific input frequency $F_{REF}$ of 240 MHz, and variable values of the N-counter 112.

TABLE I

| $F_{REF}$ (MHz) | M-counter 102 | F-counter 110 | N-counter 112 | VCO 108 (MHz) | $F_{CPU}$ (MHz) | $\Delta F_{DAF}$ (MHz) |
|---|---|---|---|---|---|---|
| 240 | 60 | 8 | 200 | 800 | 100 | 0 |
| 240 | 60 | 8 | 204 | 816 | 102 | 2 |
| 240 | 60 | 8 | 212 | 848 | 106 | 6 |
| 240 | 60 | 8 | 220 | 880 | 110 | 10 |
| 240 | 60 | 8 | 228 | 912 | 114 | 14 |
| 240 | 60 | 8 | 236 | 944 | 118 | 18 |
| 240 | 60 | 8 | 250 | 1000 | 125 | 25 |

Thus, according to the above example, users are able to change the frequency of the processor in discrete steps between 100 and 125 MHz. This conventional method of placing the processor in an overclocking mode may be referred to as "dial-a-frequency," or DAF. The N-counter value of 200 in the first row of Table I represents the default value, since it was assumed that the processor achieves 100 MHz upon start up. Accordingly, when the N-counter value is 200, the additional frequency component $\Delta F_{DAF}$ added to the default value of 100 MHz is zero.

One of the dangers of overclocking the processor according to the above example is thermal runaway. Thermal runaway occurs when the system generates heat faster than it can dissipate the generated heat. An overclocked processor typically generates more heat than one running at the manufacturer-specified speed, which makes thermal runaway more likely to occur. Accordingly, the user must be aware of the processor temperature, continuously monitoring the heat generated by the processor and ready to intervene when levels approaching thermal runaway are present. When the temperature approaches one that can put the processor in thermal runaway, the operator reduces the operating speed of the processor.

Currently, no technology exists to allow the system to dynamically change the CPU speed without user intervention while the processor is running in an overclocked mode. Embodiments of the invention address these and other disadvantages that are inherent in the above-described art.

BRIEF DESCRIPTION OF THE DRAWINGS

Some embodiments of the invention will be described with reference to the following drawings, in which like reference numbers refer to like elements.

DETAILED DESCRIPTION OF THE INVENTION

Figure 1:
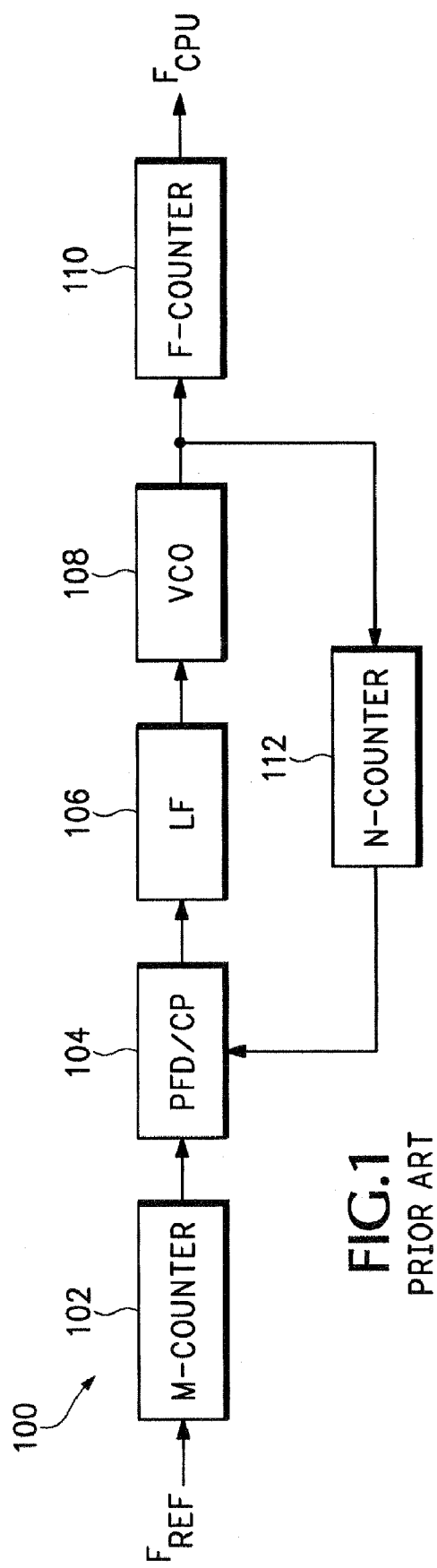
FIG. 1 is a block diagram illustrating some components of a conventional clock synthesizer.

According to embodiments of the invention, temperature, current, or other physical quantities associated with an integrated circuit, which can also include a processor, may be converted to a digital signal, and that digital signal used to select a corresponding frequency offset that is added to any pre-established overclocking frequency. Embodiments of the invention allow a user to specify a dynamic range between which the frequency offset is bounded during overclocking of the integrated circuit. The programmable lower limit specifies the frequency where the integrated circuit begins to overclock; the programmable upper limit specifies the maximum overclocking frequency that is allowed. Setting the lower limit to be equal to the upper limit forces overclocking to occur at only the specified level.

According to embodiments of the invention, there is a second mechanism available, in addition to DAF, by which the overclocking frequency of the processor may be adjusted. For convenience, this mechanism may be referred to as Dynamic Frequency overclocking, or DF. DF may be thought of as an additional frequency offset, generally variable, that is added in addition to the default hardware setting and/or the conventional DAF setting. DF may be accomplished, for example, through external pin strapping of a number of pins. In other words, the user may set the external input pins to either supply or ground level, the levels being decoded by the chip to set the overclocking frequency as will be described in further detail below.

Table II below illustrates the effect of the DF mechanism according to embodiments of the invention when the conventional DAF N-counter value is set to 200 after system boot up. Accordingly, the additional frequency component $\Delta F_{DAF}$ added to the default value of 100 MHz when the N-counter value is 200 is zero.

In Table II, a three-bit register DF[2:0] may be externally pin-strapped to obtain 8 different values, each value corresponding to an additional offset $\Delta N$ that is added to the current DAF N-counter value. Each of the eight settings for DF[2:0] corresponds to a different offset value $\Delta N$. For example, if DF[2:0] is 001, an offset value of $\Delta N=4$ will be added in addition to the value in N-counter 112 if the user desires an additional 2 MHz on top of the CPU clock frequency obtained from the DAF setting alone. Likewise, if DF[2:0] is 101, an offset value of $\Delta N=36$ will be added in addition to the value in N-counter 112 if the user desires an additional 18 MHz on top of the CPU clock frequency obtained from the DAF setting.

DAF mechanism after the system is booted up. Thus, there is no corresponding value of DF[2:0] or offset value $\Delta N$ that corresponds to row 7 of Table II, although in alternative embodiments there may be.

The last two rows of Table II correspond to DF[2:0] settings of 110 and 111, corresponding to offset values $\Delta N$ of 60 and 80, respectively. These offset values for $\Delta N$ correspond to frequencies for the VCO 108 and for $F_{CPU}$ that are greater than the maximum overclocking frequency allowed by the DAF mechanism.

Thus, according to the embodiments of the invention illustrated by Table II, if DF[2:0] settings of 110 or 111 appeared, the request to speed the processor up to the corresponding speeds may be denied, because those speeds are greater than the maximum frequencies that are allowed for the VCO 108 and the CPU based upon the conventional DAF mechanism. In other words, according to some embodiments of the invention, the maximum frequency change $\Delta F_{DF}$ (see Table II) attributable to the DF mechanism may not be greater than the maximum frequency change $\Delta F_{DAF}$ (see Table I) allowed by the DAF mechanism.

Table II illustrates the case where the conventional DAF mechanism is set to contribute a frequency change $\Delta F_{DAF}$ of zero to the overall CPU frequency $F_{CPU}$. Using the same offset values $\Delta N$ of the DF mechanism that are specified in

TABLE II

| DF [2:0] | $F_{ref}$ (MHz) | M-counter 102 | F-counter 110 | N-counter 112 | VCO 108 (MHz) | $F_{CPU}$ (MHz) | $\Delta F_{DF}$ (MHz) | $\Delta N$ |
|---|---|---|---|---|---|---|---|---|
| 000 | 240 | 60 | 8 | 200 | 800 | 100 | 0 | 0 |
| 001 | 240 | 60 | 8 | 204 | 816 | 102 | 2 | 4 |
| 010 | 240 | 60 | 8 | 212 | 848 | 106 | 6 | 12 |
| 011 | 240 | 60 | 8 | 220 | 880 | 110 | 10 | 20 |
| 100 | 240 | 60 | 8 | 228 | 912 | 114 | 14 | 28 |
| 101 | 240 | 60 | 8 | 236 | 944 | 118 | 18 | 36 |
| maximum allowed | 240 | 60 | 8 | 250 | 1000 | 125 | 25 | n/a |
| 110 | 240 | 60 | 8 | 260 | 1040 | 130 | 30 | 60 |
| 111 | 240 | 60 | 8 | 280 | 1120 | 140 | 40 | 80 |

Table II illustrates that the output value for $F_{CPU}$ may still be calculated using EQ. 1 described above. Row 7 of Table II is repeated from row 7 of Table I, and is inserted to show the maximum allowable overclocking frequency that is permitted based upon setting N-counter 112 to 250 using the Table II, if the DAF mechanism were set by the user to a non-zero value of $\Delta F_{DAF}$, there would be an increased likelihood that the higher settings of DF[2:0] would be rejected as being above the maximum allowable overclocking frequency. This is illustrated in Table III below.

TABLE III

| DF [2:0] | N-counter 112 (DAF only) | $\Delta N$ | N-counter 112 (DAF + DF) | VOC 108 (MHz) | $F_{CPU}$ (MHz) | $\Delta F_{(DAF + DF)}$ (MHz) |
|---|---|---|---|---|---|---|
| 000 | 220 | 0 | 220 | 880 | 110 | 10 |
| 001 | 220 | 4 | 224 | 896 | 112 | 12 |
| 010 | 220 | 12 | 232 | 928 | 116 | 16 |
| 011 | 220 | 20 | 240 | 960 | 120 | 20 |
| 100 | 220 | 28 | 248 | 992 | 124 | 24 |
| maximum allowed | 250 | N/A | N/A | 1000 | 125 | 25 |
| 101 | 220 | 36 | 256 | 1024 | 128 | 28 |
| 110 | 220 | 60 | 280 | 1120 | 140 | 40 |
| 111 | 220 | 80 | 300 | 1200 | 150 | 50 |

In Table III, it is assumed that the values of $F_{REF}$, the M-counter 102, and the F-counter 110 remain the same as in Tables I and II. However, in Table III it is assumed that the user sets the DAF mechanism so that the N-counter 112 has a value of 220, which would result in an overclocking frequency of 110 MHz if there were no contribution from the DF mechanism. Accordingly, row 4 of Table II is effectively the same as row 1 of Table III because both rows result in the same value for $F_{CPU}$.

Row 6 of Table III is repeated from row 7 of Table I, and is inserted to show the maximum allowable overclocking frequency that is permitted based upon setting N-counter 112 to 250 using the DAF mechanism after the system is booted up. Thus, there is no corresponding value of DF[2:0] or offset value ΔN that corresponds to row 6 of Table III, although in alternative embodiments there may be.

Table III illustrates that when the N-counter 112 is set to a value with the DAF mechanism that results in a non-zero contribution to the frequency $F_{CPU}$, there may be more settings of DF[2:0] that result in an overclocking frequency that exceeds the maximum overclocking frequency that is allowed by the DAF mechanism alone. Thus, according to some embodiments of the invention, requests for offset values ΔN of 36, 60, and 80 (corresponding to the DF[2:0] settings of 101, 110, and 111, respectively) would be disallowed. In other words, according to embodiments of the invention, the combined maximum frequency change $\Delta F_{(DAF+DF)}$ (see Table III) attributable to the DF mechanism and the conventional DAF mechanism may not be greater than the maximum frequency change $\Delta F_{DAF}$ (see Table I) that is allowed by the DAF mechanism alone.

Figure 2:
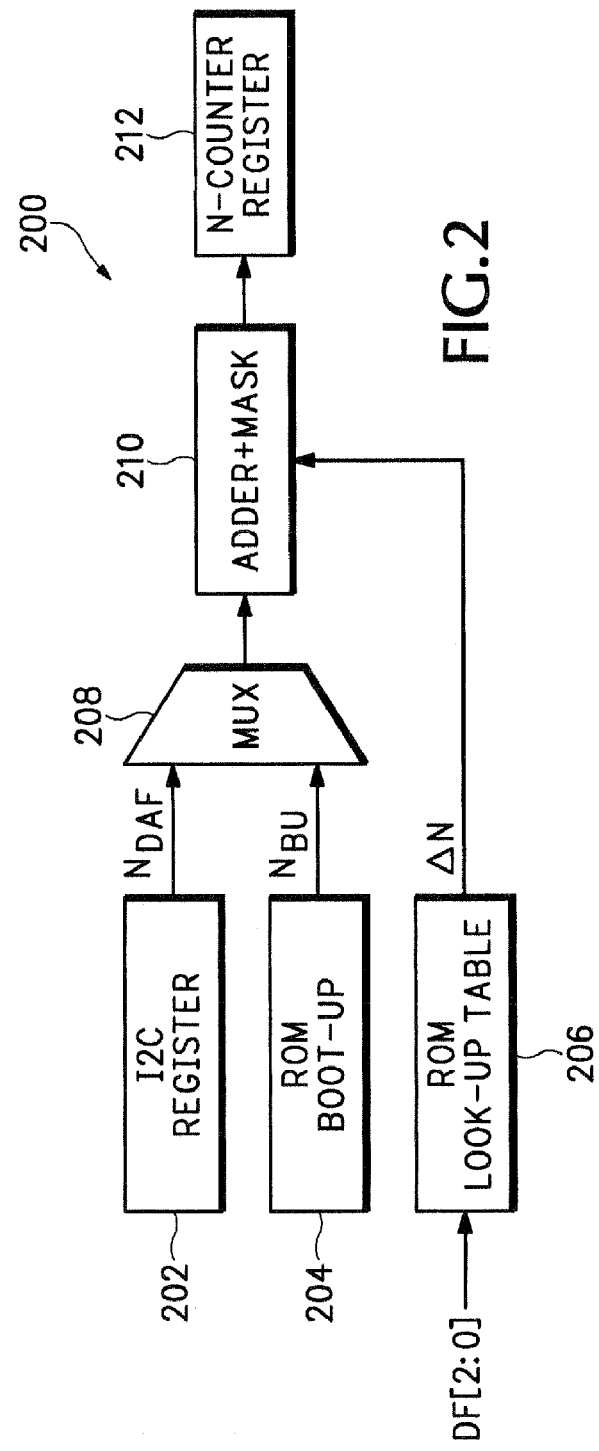
FIG. 2 is a block diagram illustrating a circuit according to some embodiments of the invention.

FIG. 2 is a block diagram illustrating a circuit 200 according to some embodiments of the invention. The circuit includes an I2C register 202, an ROM boot-up table 204, and an ROM look-up table 206. The ROM boot-up table 204 contains values that will set the processor (not shown) to the manufacturer-specified frequency (no overclocking). The I2C register 202 is the register that may be programmed by the user after system boot-up to specify a particular overclocking frequency in accordance with the DAF mechanism that was explained above. The ROM look-up table 206 contains offset values ΔN, and outputs one of eight particular offset values ΔN based upon the input DF[2:0].

The circuit 200 also contains a MUX 208, Adder/Mask 210, and an N-count register 212. Initially, the MUX 208 selects the values from ROM boot-up table 204 when the system is booted and passes these values to the Adder/Mask 210. The Adder/Mask 210 loads the hardware boot-up values into the N-count register 212, assuming that there is no additional offset value ΔN specified by the inputs DF[2:0].

If the user programs the I2C register 202 to change the N-counter value using the DAF mechanism that was explained above, the value $N_{DAF}$ from the register 202 is selected by the MUX 208 and passed to the Adder/Mask 210. If an additional offset ΔN specified by the inputs DF[2:0] is present, the Adder/Mask 210 will add this offset to the $N_{DAF}$ value and output the sum to the N-count register 212.

Thus, the circuit 200 implements the functionality described with reference to Tables II and III, adding an additional offset ΔN contributed by the DF mechanism to the pre-existing value of $N_{DAF}$ specified by the DAF mechanism.

Figure 3:
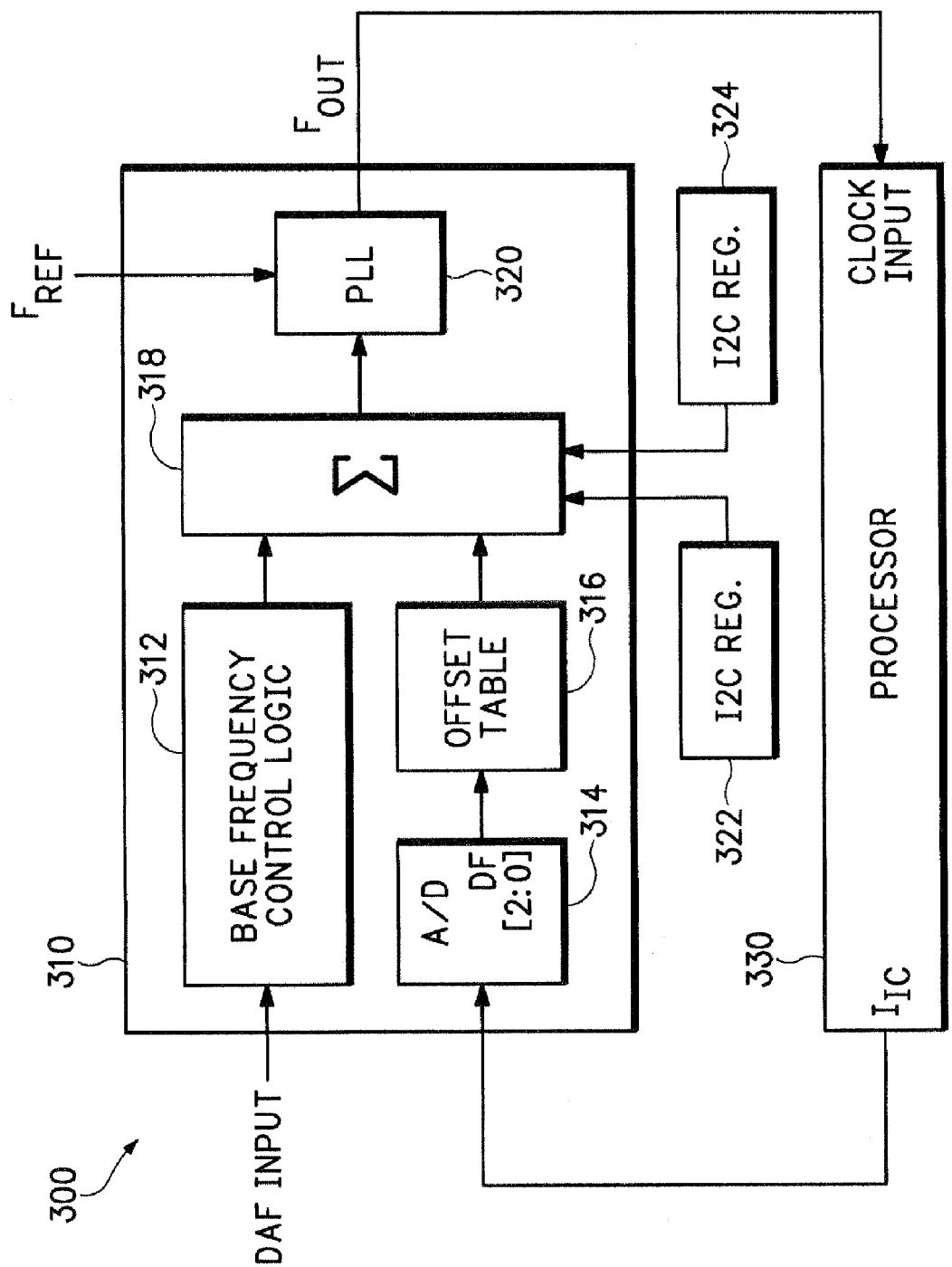
FIG. 3 is a block diagram illustrating a system according to other embodiments of the invention.

FIG. 3 is a block diagram illustrating a system 300 according to some embodiments of the invention. The system 300 includes a processor 330 and a clock synthesizer 310, which generates an adjusted clock frequency $F_{OUT}$ for the processor 330.

The clock synthesizer 310 includes an A/D converter 314 that receives as an input an analog current signal $I_{IC}$ from the processor 330. According to alternative embodiments of the invention, the processor 330 may have dedicated pins that are configured to directly output a digital signal that is representative of the processor current. In such cases, the A/D converter 314 would not be necessary. The A/D converter 314 converts the analog current signal $I_{IC}$ to, for example, a three-bit output signal DF[2:0]. Of course, the number of bits in the DF signal may be more or less than three bits.

The three-bit output signal DF[2:0] is input to the offset table 316, which outputs the corresponding offset value ΔN to the adder/mask logic 318. The adder/mask logic 318 adds the specified offset value ΔN to the base frequency value obtained from the base frequency control logic 312. The base frequency control logic 312 outputs the base frequency value based upon any DAF input that it receives. In some embodiments of the invention, the base frequency control logic 312 may include an I2C register 202 and ROM boot-up logic 204, as illustrated in FIG. 2.

The adder/mask logic 318 produces an adjusted frequency select signal that is input to the PLL 320. In some embodiments of the invention, the PLL 320 may have the same structure as the clock synthesizer illustrated in FIG. 1. In such a case, the adjusted frequency select signal from the adder/mask logic 318 is used to load the appropriate value into the N-counter 112. In any event, using the reference frequency $F_{REF}$ and the adjusted frequency select signal from the adder/mask logic, the PLL 320 produces an output frequency $F_{OUT}$ that is fed to the clock input of the processor 330.

As explained above in Tables II, III, and FIG. 2, the three-bit output signal DF[2:0] may be used to indicate an associated offset value ΔN that is added to the base frequency indicated by the DAF mechanism. Because the analog current signal $I_{IC}$ is a measure of the instantaneous power consumption of the processor 330, the analog current signal $I_{IC}$ will change dynamically during operation of the processor 330. Thus, an increase in power consumption results in an increased level of the signal DF[2:0]. An increased level of the signal DF[2:0] corresponds to a request for a greater offset value ΔN, allowing the processor 330 to run at an increased overclocking mode, which in turn increases the power consumption. In other words, a positive feedback loop is present.

In order to prevent the positive feedback loop from resulting in thermal runaway, embodiments of the invention provide the ability to set an upper and lower range limit that further bound the DF overclocking mechanism and prevents a thermal runaway from occurring. In some embodiments of the invention, as illustrated in FIG. 3, the upper and lower range limits can be provided by programmable I2C registers 322, 324 to the adder/mask logic 318. The adder/mask logic 318 compares the sum of the base frequency (containing any overclocking from the DAF mechanism) and the offset value ΔN obtained from the offset table 316. If the sum is greater than the upper range limit, the adjusted frequency select signal output by the adder/mask logic 318 is set to the upper range limit. If the sum is less than the lower range limit, the adjusted frequency select signal output by the adder/mask logic 318 is set to the lower range limit. Consequently, thermal runaway is prevented because the processor clock is bounded by the upper range limit.

According to some embodiments of the invention, the upper range limit and the lower range limit may also be set to the same value. In this case, the processor clock is forced to operate in overclocking mode at a single value, regardless of the value that is obtained through the combined effect of the DAF and DF mechanism that was explained above with regard to Table III. This is an advantage compared to overclocking using only the DAF mechanism, because the overclocking frequency may be set to any value and is not limited to specific discrete frequencies (see Table I).

As was explained above with reference to Table III, although the combined maximum frequency change $\Delta F_{(DAF+DF)}$ attributable to the DF mechanism and the conventional DAF mechanism may not be greater than the maximum frequency change $\Delta F_{DAF}$ that is allowed by the DAF mechanism, when the processor is installed within the overall system, i.e., within the motherboard, sustained operation at the maximum overclocking frequency change $\Delta F_{DAF}$ may still cause thermal runaway to occur because of additional heat generated by other system components. For this reason, the above-described embodiments of the invention, which allow an upper range limit and a lower range limit to be set, may be very desirable for motherboard manufacturers who are aware of the system operating environment for the processor. In other words, motherboard manufacturers may set the upper range limit to a level that is more appropriate to system requirements, typically, but not always, below the maximum frequency change $\Delta F_{DAF}$ that is allowed by the DAF mechanism.

Table IV below further illustrates the operation of the upper and lower range limits to preempt, in some cases, the requested frequency offset value $\Delta F_{DF}$. In Table IV it is assumed that the change in overclocking frequency due to the conventional DAF mechanism ($\Delta F_{DAF}$) is zero, and that the processor's advertised (non-overclocked) speed is 100 MHz.

TABLE IV

| DF[2:0] | $\Delta F_{DF}$ (MHz) | Upper limit | Lower limit | CPU Frequency (MHz) |
|---|---|---|---|---|
| 000 | 0 | 010 | 001 | 102 |
| 001 | +2 | 010 | 001 | 102 |
| 010 | +6 | 011 | 001 | 106 |
| 011 | +10 | 011 | 011 | 110 (fixed) |
| 100 | +14 | 100 | 100 | 114 (fixed) |
| 101 | +18 | 101 | 101 | 118 (fixed) |
| 110 | +30 | 110 | 101 | 130 |
| 111 | +40 | 101 | 011 | 118 |

For convenience, it is assumed in Table IV that the values appearing in the upper limit and lower limit column correspond to the same frequency offset $\Delta F_{DF}$ that a matching value in the DF[2:0] column corresponds to. For instance, DF[2:0]=111 corresponds to a requested frequency offset $\Delta F_{DF}$ of +40, and a value of 111 in the upper limit column also corresponds to an upper limit of +40. In alternative embodiments of the invention, the values used for the upper and lower limits may correspond to different offsets than the same value used for DF[2:0].

Some of the examples given in Table IV will be explained in the discussion that follows. In rows 4–6 of Table IV, the upper limit and lower limit are both set at the same value, which causes the CPU frequency to be fixed at one specific overclocked value. In row 1 of Table IV, the frequency offset $\Delta F_{DF}$ requested by DF[2:0]=000 is 0 MHz. However, the lower limit is set to 001, corresponding to a frequency offset $\Delta F_{DF}$ of +2 MHz, so the point at which CPU overclocking starts is 102 MHz. In row 8 of Table IV, the frequency offset $\Delta F_{DF}$ requested by DF[2:0]=111 is +40 MHz. However, the upper limit is set to 101, corresponding to an offset $\Delta F_{DF}$ of +18 MHz, so the CPU overclocking frequency is limited to the upper range limit of 118 MHz.

Figure 4:
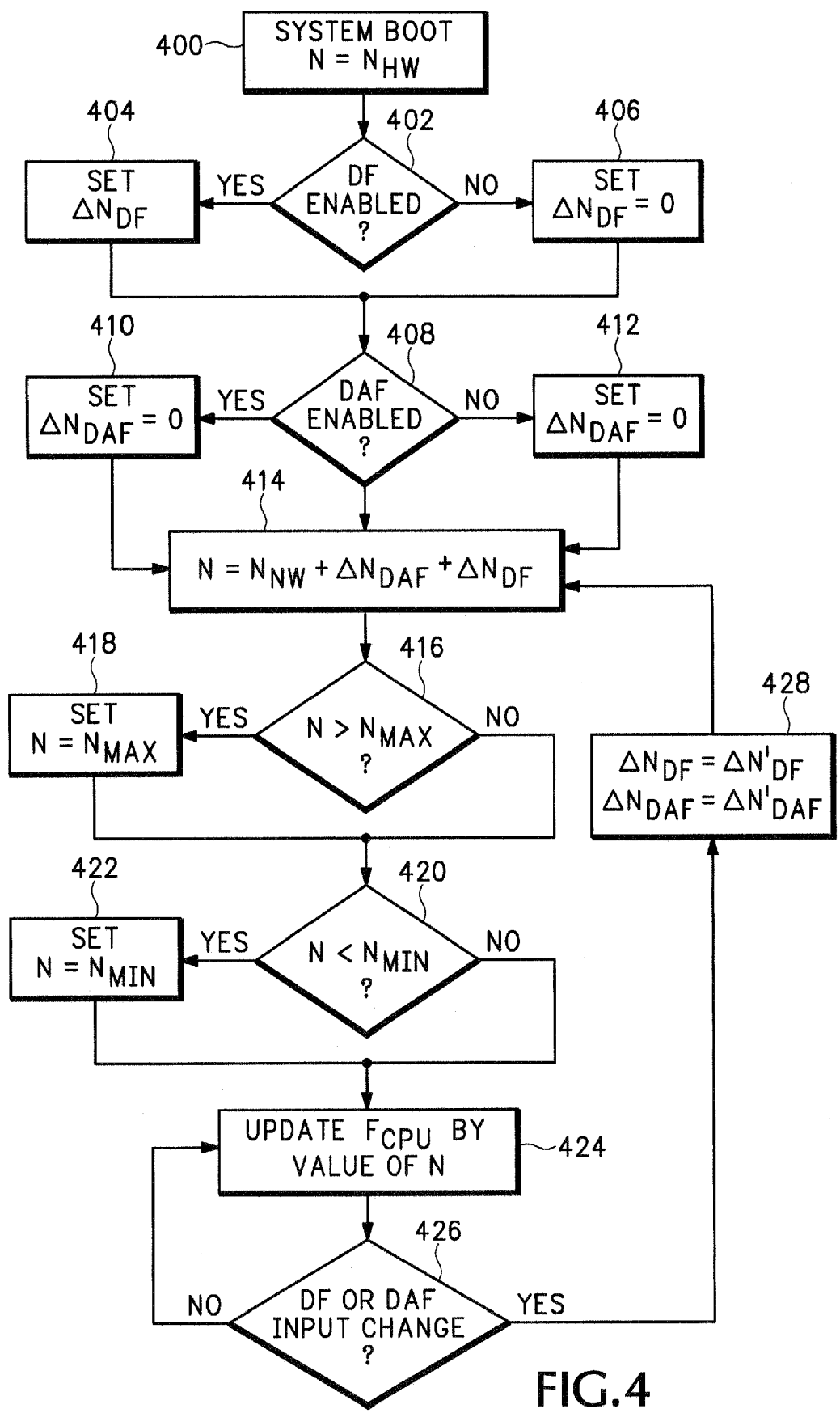
FIG. 4 is a flow chart illustrating an example method according to some embodiments of the invention.

FIG. 4 is an example flow diagram illustrating some processes involved in a method according to some embodiments of the invention. In order to further explain the processes of FIG. 4, reference will also be made to FIG. 2.

At process 400, system boot-up occurs, and the initial speed of the processor is set by assigning to the variable value N the specific value $N_{HW}$. With reference to FIG. 2, the process 400 may include the MUX 208 passing the value $N_{BU}$ stored in ROM Boot-up 204 to the Adder 210, where it is relayed to and stored in the N-count register 212. This is used to establish the initial processor speed.

Process 402 determines whether the DF overclocking mechanism is enabled. If not, the offset $\Delta N_{DF}$ is set to zero in process 406. If there is a valid input, the offset $\Delta N_{DF}$ is set to the appropriate value that corresponds to the received input in process 404. With reference to FIG. 2, process 404 may include the ROM look-up table 206 outputting the offset $\Delta N$ corresponding to the input DF[2:0].

Process 408 determines whether the DAF overclocking mechanism is enabled. If not, the offset $\Delta N_{DAF}$ is set to zero in process 412. If there is a valid input, the offset $\Delta N_{DAF}$ is set to the appropriate value that corresponds to the received input in process 410. With reference to FIG. 2, process 410 may include programming the I2C register 202 to output the desired value of $N_{DAF}$, the $N_{DAF}$ value equal to the sum of $N_{BU}$ from the ROM Boot-up section 204 and an additional desired offset that places the processor in an overclocking mode.

At process 414, the value of N is assigned the sum of the $N_{HW}$, $\Delta N_{DAF}$, and $\Delta N_{DF}$ values. With reference to FIG. 2, process 414 may include adder/mask 210 adding the offset value $\Delta N$ and a value selected from between $N_{DAF}$ and $N_{BU}$.

At process 416, the current value of N is compared to the upper limit $N_{MAX}$. If the current value of N is greater than the upper limit $N_{MAX}$, N is assigned the value of $N_{MAX}$ in process 418 before moving on to process 420. At process 420, the current value of N is compared to the lower limit $N_{MIN}$. If the current value of N is less than the lower limit $N_{MIN}$, N is assigned the value of $N_{MIN}$ in process 4422 before moving on to process 424. With reference to FIG. 2, this comparing/filtering process may be performed in the adder/mask 210.

At process 424, the output frequency value $F_{CPU}$ is updated by the current value of N. With reference to FIG. 2, process 424 may include updating the N-count register 212 with the value output from adder/mask 210.

At process 426, the DF and DAF inputs are monitored for change in status. If there are no changes to the DF and DAF inputs, process 424 is returned to and the current value of N is maintained, thus the overclocking frequency remains the same. If there are changes to either of the DF and DAF inputs, the corresponding offset values $\Delta N_{DAF}$ and/or $\Delta N_{DF}$ are updated in process 428. Next, process 414 updates the current value of N based upon the new offset values $\Delta N_{DAF}$ and/or $\Delta N_{DF}$, and the other processes are then repeated as substantially as explained above.

Consequently, according to the above embodiments of the invention, the overclocking frequency of the processor is dynamically changed, without user intervention, by overlaying the variable frequency DF offset onto the conventional DAF frequency offset. Furthermore, the lower and upper limits to the overclocking can be specified, thereby preventing thermal runaway.

Figure 5:
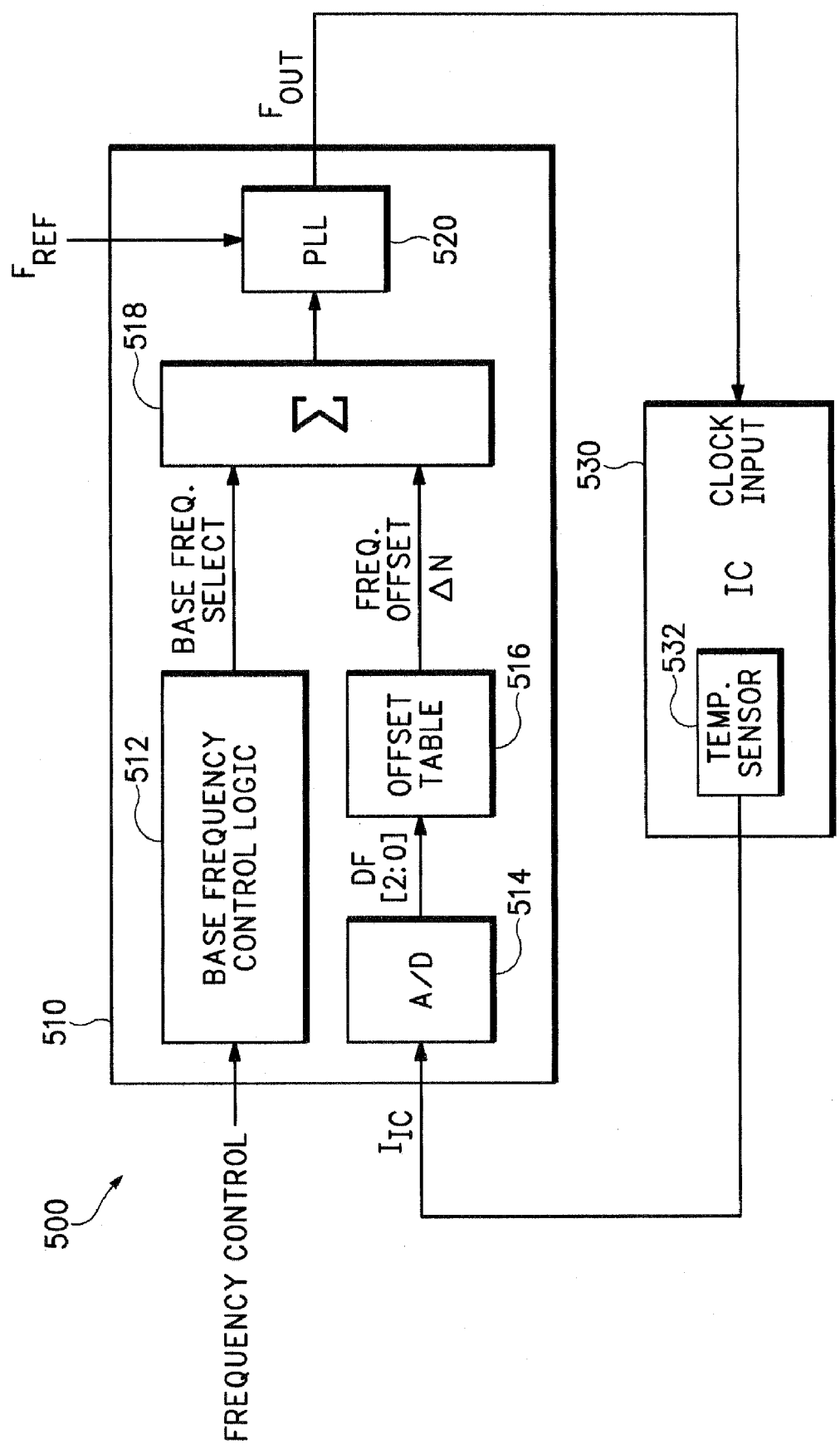
FIG. 5 is a block diagram illustrating a system according to some embodiments of the invention.

FIG. 5 is a block diagram illustrating a system 500 according to some embodiments of the invention. The system 500 includes an integrated circuit (IC) 530 and a clock synthesizer 510, which generates an adjusted clock frequency $F_{OUT}$ for the IC 530.

The clock synthesizer includes an A/D converter 514 that receives as an input an analog signal $I_{IC}$ from the processor 530, the analog signal representative of the temperature of the IC 530. According to alternative embodiments of the invention, the IC 530 may have dedicated pins that are configured to directly output a digital signal that is representative of the temperature. In such cases, the A/D converter 514 would not be necessary. The A/D converter 514 converts the analog signal $I_{IC}$ to a three-bit output signal DF[2:0]. In alternative embodiments of the invention, the number of bits in the DF signal may be more or less than three bits. Accordingly, the temperature of the IC 530 may be represented by 8 distinct signals obtainable with DF[2:0].

The three-bit output signal DF[2:0] is input to the offset table 516, which outputs a frequency offset signal ΔN to the adder/mask logic 518. The adder/mask logic 518 adds the specified offset value ΔN to the base frequency value obtained from the base frequency control logic 512. The base frequency control logic 512 outputs the base frequency value in response to the frequency control input. In some embodiments of the invention, the base frequency control logic 512 may include an I2C register 202 and ROM boot-up logic 204, as illustrated in FIG. 2.

The adder/mask logic 518 produces an adjusted frequency select signal that is input to the PLL 520. In some embodiments of the invention, the PLL 520 may have the same structure as the clock synthesizer illustrated in FIG. 1. In such a case, the adjusted frequency select signal from the adder/mask logic 518 is used to load the appropriate value into the N-counter 112. In any event, using the reference frequency $F_{REF}$ and the adjusted frequency select signal from the adder/mask logic, the PLL 520 produces an output frequency $F_{OUT}$ that is fed to the clock input of the processor 330.

As explained above in Tables II, III, and FIG. 2, the three-bit output signal DF[2:0] may be used to indicate an associated offset value ΔN that is added to the base frequency indicated by the DAF mechanism. Because the analog current signal $I_{IC}$ is a measure of the temperature of the IC 530, the analog current signal $I_{IC}$ will change dynamically during operation of the IC 530. Thus, an increase in power consumption generally results in an increased temperature level, and a corresponding increase in the signal DF[2:0].

In the embodiments described above with reference to FIG. 3, thermal runaway was prevented despite the positive feedback loop by placing an upper and lower limit on the overclocking range of the CPU frequency. In the embodiments described with reference to FIG. 5, positive feedback may be avoided by choosing appropriate offset values ΔN corresponding to each of the signals DF[2:0]. For example, a DF[2:0] level of 111 will typically correspond to the highest temperature level achieved by the IC 530. Thus, in order to avoid thermal runaway, the offset value ΔN corresponding to DF[2:0]=111 should correspond to a relatively low offset value ΔN. Alternatively, a DF[2:0] signal of 000 or 001, corresponding to relatively cool temperatures of the IC 530, may be associated with offset values that are significantly larger.

As one example, the offset values ΔN listed in column 2 of Table IV could simply be reversed with respect to the signals DF[2:0] found in column 1 of Table IV. In other words, DF[2:0]=000 would correspond to an offset value ΔN of +40 MHz, and DF[2:0]=111 would correspond to an offset value ΔN of 0 MHz. Consequently, as the temperature level of the IC 530 rises, the offset value contributed to the overclocking frequency by the DF mechanism becomes correspondingly smaller, averting a thermal runaway condition. It should be apparent that the range of the offset values and the distribution of possible offset values within that range is adjustable based upon the number of bits X in the DF[(X−1):0] signal and choosing an appropriate offset value ΔN for each DF[(X−1):0].

One of ordinary skill in the art will recognize that the concepts taught herein can be tailored to a particular application in many other advantageous ways. In particular, those skilled in the art will recognize that the illustrated embodiments are but one of many alternative implementations that will become apparent upon reading this disclosure. For instance, the offset values ΔN corresponding to particular DF signals described above were presented merely as examples, there is no reason why the offset values should be limited only to the examples described.

Furthermore, functionality shown embodied in a single integrated circuit or functional block may be implemented using multiple cooperating circuits or blocks, or vice versa. Such minor modifications are encompassed within the embodiments of the invention, and are intended to fall within the scope of the claims.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

It will be appreciated by those skilled in the art that changes in these described embodiments of the invention may be made without departing from the principles and spirit of the invention itself, the scope of which is defined by the appended claims.

We claim:

1. An apparatus comprising:
    an offset table structured to output an offset value in response to an input signal;
    an adder structured to sum the offset value and a base value to obtain an adjusted value; and
    a circuit structured to output an adjusted frequency in response to receiving a reference frequency and the adjusted value;
    wherein the adder comprises a filter structured to compare the adjusted value to a specified set of values and to reset the adjusted value to a nearest value in the specified set of values when the adjusted value is not equal to one of the specified set of values, the nearest value being defined as a value in the specified set of values whose difference with the adjusted value is of the smallest magnitude.

2. The apparatus of claim 1, further comprising:
    an analog-to-digital converter configured to provide the input signal to the offset table.

3. The apparatus of claim 1 wherein the offset table comprises a segment of ROM.

4. The apparatus of claim 1 wherein the specified set of values consists of a single value.

5. The apparatus of claim 1, further comprising a programmable register structured to store the specified set of values.

6. The apparatus of claim 1, further comprising base frequency control logic configured to choose the base value from between a value stored in a boot-up table and a value stored in a programmable register.

7. A system comprising:
   an integrated circuit structured to receive a clock input and produce an output signal;
   a register structured to output no more than two limit values; and
   a clock circuit structured to output the clock input, the clock circuit further structured to vary the clock input by adding to a base value one of the no more than two limit values and an offset value, the offset value selected if it has a magnitude equal to or between the respective magnitudes of the no more than two limit values, where the offset value is variable in response to the output signal.

8. The system of claim 7 wherein the integrated circuit comprises a processor.

9. The system of claim 7 wherein the no more than two limit values consisting of a maximum offset from the base value and a minimum offset from the base value.

10. The system of claim 7, wherein the no more than two limit values include a single value that defines both a maximum offset from the base value and a minimum offset from the base value.

11. The system of claim 7 wherein the output signal comprises a signal representative of an instantaneous power consumption of the integrated circuit.

12. The system of claim 7 wherein the output signal comprises a signal representative of a temperature of the integrated circuit.

13. The system of claim 7 wherein the clock circuit comprises base frequency control logic configured to choose the base value from between a value stored in a boot-up table and a value stored in a programmable register.

14. A method comprising:
   producing a variable offset value that varies in response to an output of an integrated circuit;
   storing, a fixed base value that does not vary in response to the output of the integrated circuit;
   adding the variable offset value to the fixed base value to generate a value at which to dynamically overclock a clock input of the integrated circuit;
   comparing the one of the plurality of offset values to a specified range of values that limits the variability of the variable offset value; and
   assigning the variable offset value a value corresponding to a limit of the specified range when the variable offset value is outside of the specified range;
   wherein producing the variable offset value comprises:
      storing a plurality of offset values in a look-up table; and
      retrieving one of the plurality of offset values in response to a level of the output.

15. The method of claim 14 wherein assigning the variable offset value the value corresponding to the limit of the specified range comprises:
   assigning the variable offset value the value corresponding to a limit whose difference with the variable offset value has the smallest magnitude.

16. The method of claim 14 wherein adding the variable offset value to the fixed base value to dynamically overclock the clock input of the integrated circuit comprises:
   inputting a sum of the variable offset value and the fixed base value into a frequency adjustment circuit; and
   changing the clock input produced by the frequency adjustment circuit by modifying a reference frequency that is input to the frequency adjustment circuit using the sum.

17. The method of claim 16 wherein inputting a sum comprises inputting a sum into a phase-locked loop circuit.

* * * * *